(12) United States Patent
Davis

(10) Patent No.: US 12,717,323 B2
(45) Date of Patent: Aug. 25, 2026

(54) AUTOMATIC FIELD BOUNDARY GENERATION

(71) Applicant: Deere & Company, Moline, IL (US)

(72) Inventor: Travis J. Davis, Polk City, IA (US)

(73) Assignee: Deere & Company, Moline, IL (US)

( * ) Notice: Subject to any disclaimer, the term of this patent is extended or adjusted under 35 U.S.C. 154(b) by 630 days.

(21) Appl. No.: 17/847,584

(22) Filed: Jun. 23, 2022

(65) Prior Publication Data

US 2023/0418293 A1 Dec. 28, 2023

(51) Int. Cl.
*G05D 1/00* (2024.01)
*G06V 20/10* (2022.01)

(52) U.S. Cl.
CPC ......... *G05D 1/0094* (2013.01); *G05D 1/0212* (2013.01); *G06V 20/188* (2022.01)

(58) Field of Classification Search
CPC .. G05D 1/0094; G05D 1/0212; G05D 1/2297; G05D 1/6484; G05D 2105/15; G05D 2107/21; G05D 2109/10; G05D 2111/14; G05D 1/243; G06V 20/188; G06V 10/143; G06V 10/58; G06V 10/764; G06V 20/56
See application file for complete search history.

(56) References Cited

U.S. PATENT DOCUMENTS 10,395,115 B2 8/2019 Kumar et al.
11,263,707 B2 * 3/2022 Perry ..................... G06Q 50/02
2017/0223947 A1 * 8/2017 Gall ................... G01N 21/4738
2018/0259496 A1 * 9/2018 McPeek ............... G01N 33/025
2018/0348760 A1 12/2018 Peverill et al.
2020/0181879 A1 * 6/2020 Halder .................. E02F 9/2054
2020/0394813 A1 * 12/2020 Theverapperuma ......................... G05D 1/0257
2021/0103728 A1 * 4/2021 Young .................... G06V 20/56
2022/0198703 A1 * 6/2022 Evans ....................... G06T 3/40

OTHER PUBLICATIONS

Hanuschak, G. "Use of Remote Sensing for Agriculture Statistics: The U.S. Experience." International Seminar on Remote Sensing for Agricultural Statistics, May 11-12, 1998, six pages.

* cited by examiner

*Primary Examiner* — Anne Marie Antonucci
*Assistant Examiner* — Luis G Del Valle
(74) *Attorney, Agent, or Firm* — Fenwick and West LLP

(57) ABSTRACT

Spectral image data representative of contents of a field is accessed via sensors of a vehicle being manually operated in the field. The spectral image data includes visible spectrum image data and non-visible spectrum image data. Portions of the field that include crops are identified by applying a machine-learned model to the accessed spectral data. The model is configured to classify portions of the visible spectrum image data as including crops and not including crops based at least in part on the non-visible spectrum image data. A field boundary representative of areas where the vehicle can navigate is generated based at least in part on the identified portions of the field that include crops. An operating mode of the vehicle is modified from manual operation to automated operation. In the automated operation mode, the vehicle generates a navigation path through the field within the generated field boundary.

17 Claims, 5 Drawing Sheets

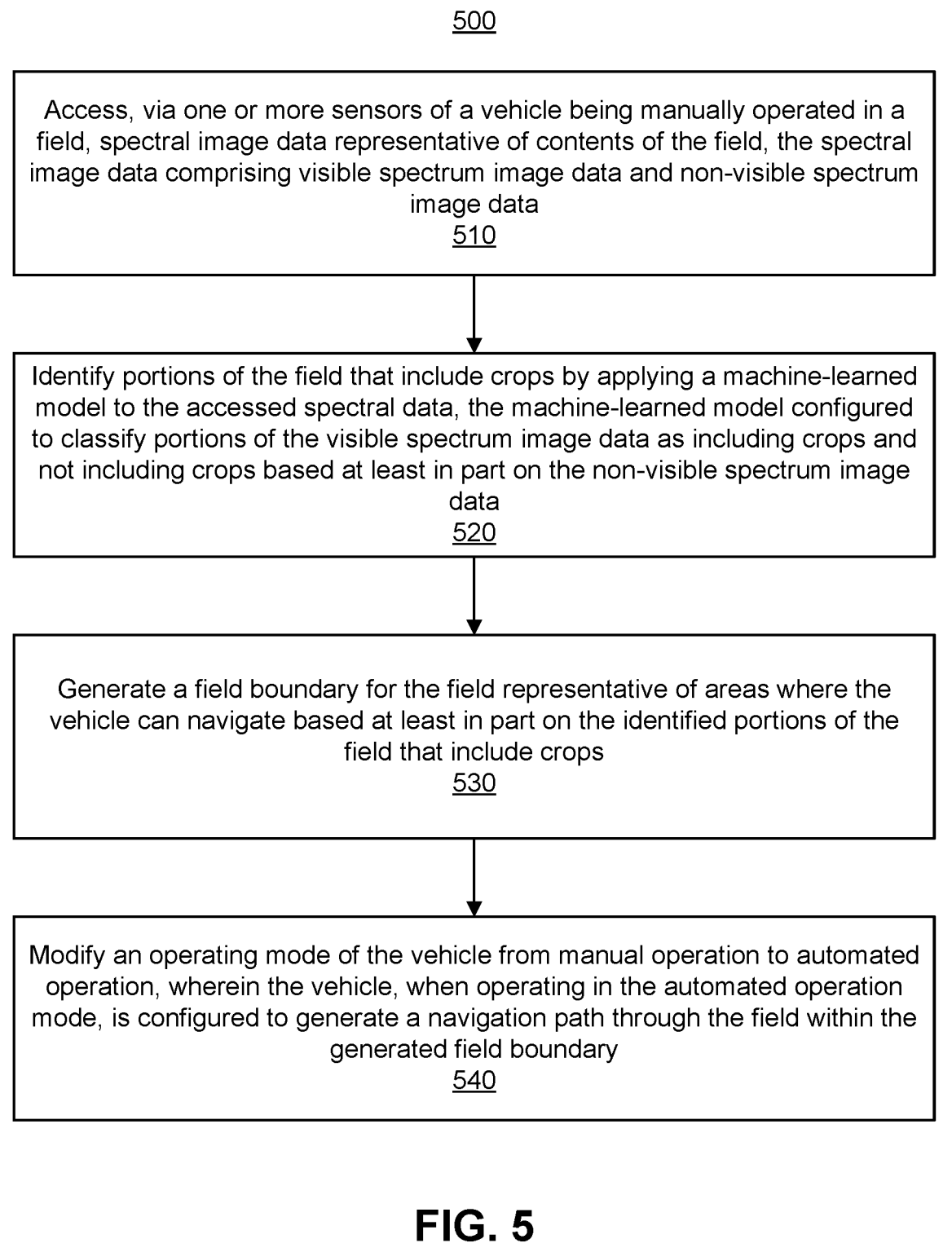

500

Access, via one or more sensors of a vehicle being manually operated in a field, spectral image data representative of contents of the field, the spectral image data comprising visible spectrum image data and non-visible spectrum image data
510

Identify portions of the field that include crops by applying a machine-learned model to the accessed spectral data, the machine-learned model configured to classify portions of the visible spectrum image data as including crops and not including crops based at least in part on the non-visible spectrum image data
520

Generate a field boundary for the field representative of areas where the vehicle can navigate based at least in part on the identified portions of the field that include crops
530

Modify an operating mode of the vehicle from manual operation to automated operation, wherein the vehicle, when operating in the automated operation mode, is configured to generate a navigation path through the field within the generated field boundary
540

FIG. 5

AUTOMATIC FIELD BOUNDARY GENERATION

TECHNICAL FIELD

The disclosure generally relates to the field of autonomous off-road vehicle preparation, and specifically to navigation within an off-road environment by a highly automated or autonomous off-road vehicle.

BACKGROUND

Setting a boundary in an off-road environment (e.g., agricultural field, construction worksite) has become important as highly automated and autonomous off-road vehicles (e.g., farming machines, construction machines) have become prevalent. For example, prior to an autonomous farming machine entering an agricultural field to perform various autonomous farming operations (e.g., tilling, planting seeds, fertilizing plants, treating plants (e.g., weed or pest treatments), harvesting, and the like), it is important to map out the boundary of the field, so that the farming machine may stay and operate safely within the set field boundary. However, setting the field boundary can be cumbersome, and it is difficult to map out the boundary automatically.

SUMMARY

In one embodiment, a method includes a step of accessing, via one or more sensors of a vehicle being manually operated in a field, spectral image data representative of contents of the field. The spectral image data includes visible spectrum image data and non-visible spectrum image data. The method further includes a step of identifying portions of the field that include crops by applying a machine-learned model to the accessed spectral data. The machine-learned model is configured to classify portions of the visible spectrum image data as including crops and not including crops based at least in part on the non-visible spectrum image data. Still further, the method includes a step of generating a field boundary for the field representative of areas where the vehicle can navigate based at least in part on the identified portions of the field that include crops. And still further, the method includes a step of modifying an operating mode of the vehicle from manual operation to automated operation. The vehicle, when operating in the automated operation mode, is configured to generate a navigation path through the field within the generated field boundary.

In another embodiment, an autonomous off-road vehicle (AOV) includes a spectral camera, a hardware processor, and a non-transitory computer-readable storage medium storing executable instructions that, when executed by the hardware processor, cause the AOV to perform multiple steps. The steps include a step of capturing, via the multi-spectral camera and while the AOV is being manually operated in a field, spectral image data representative of contents of the field. The spectral image data includes visible spectrum image data and non-visible spectrum image data. The steps further include a step of identifying portions of the field that include crops by applying a machine-learned model to the accessed spectral data. The machine-learned model is configured to classify portions of the visible spectrum image data as including crops and not including crops based at least in part on the non-visible spectrum image data. Still further, the steps include a step of setting a field boundary for the field representative of areas where the vehicle can navigate based at least in part on the identified portions of the field that include crops. And still further, the steps include a step of operating the AOV in an automated mode. The AOV, when operating in the automated mode, is configured to generate a navigation path through the field within the generated field boundary.

In yet another embodiment, a method for autonomously navigating an off-road vehicle (AOV) is provided which includes a step of capturing, via one or more sensors of an AOV being manually operated in a field, spectral image data representative of contents of the field. The spectral image data includes visible spectrum image data and non-visible spectrum image data. The method further includes a step of capturing, via a location sensor mounted on the AOV, geolocation data corresponding to the captured spectral image data. Still further, the method includes a step of transmitting the spectral image data and the corresponding geolocation data to a central server. The central server applies a machine-learned model to the spectral image data to identify portions of the field that include crops by classifying portions of the visible spectrum image data as including crops and not including crops based at least in part on the non-visible spectrum image data. Still further, the method includes a step of receiving, from the central server, a field boundary representative of areas where the AOV can navigate based at least in part on the identified portions of the field that include crops. And still further, the method includes a step of operating the AOV in an autonomous operation mode by generating a navigation path through the field within the generated field boundary.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

FIG. 5 is a flow chart illustrating a process for automatically generating and setting a field boundary based on crop classification data, according to various embodiments.

DETAILED DESCRIPTION

Figure 1:
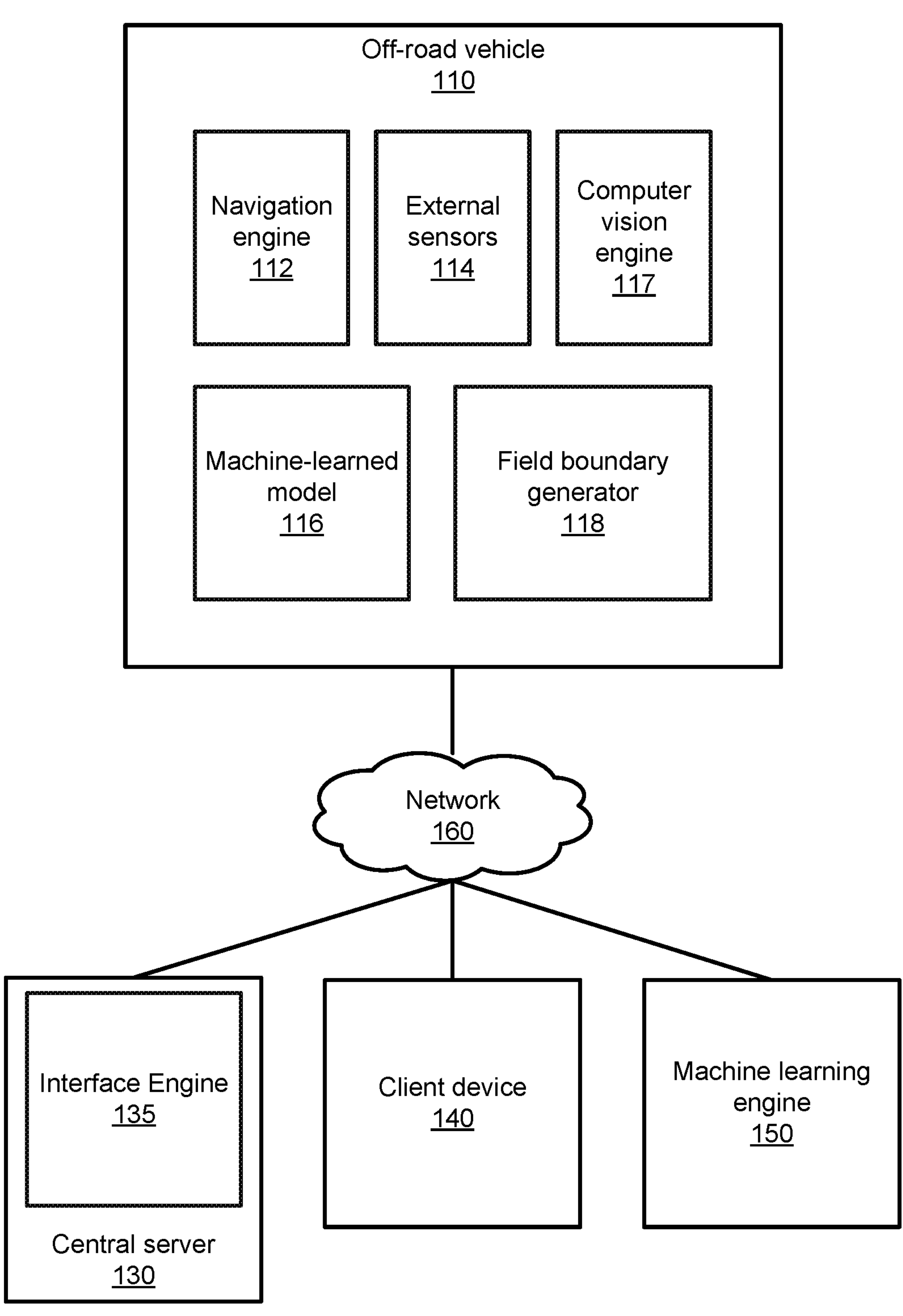
FIG. 1 illustrates an autonomous off-road vehicle system environment, according to various embodiments.

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Automatic Field Boundary Generation Overview

In order for an autonomous off-road vehicle (AOV) to autonomously navigate in an off-road environment, a boundary of the off-road environment may need to be set before the AOV can enter the off-road environment and start navigating autonomously. Examples of the off-road environment include agricultural sites or fields, construction sites, forest or wooded sites, hill or mountain trails or sites, and the like. Examples of off-road vehicles include farming vehicles, tractors, excavators, bulldozers, transport vehicles, delivery vehicles, or other vehicles configured to operate in an off-road context (e.g., on surfaces other than paved roadway). As used herein, "autonomous" refers to the ability of the off-road vehicle to operate without constant human supervision, for instance enabling the off-road vehicle to move, navigate, perform a function, and/or make a decision without explicitly receiving instructions from a human operator.

For example, in an agricultural field, it may be necessary to map out in advance a field boundary prior to allowing the AOV to enter the field, and perform various farming operations (e.g., tilling, planting seeds, fertilizing plants, treating plants (e.g., weed or pest treatments), harvesting, and the like) autonomously. A field boundary may include at least one of a geometric border, a peripheral or outer edge, and one or more inner edges of a field (e.g., agricultural site, construction site, work site, forest site, outdoor field, indoor greenhouse, and the like) that define a field area which is navigable by the AOV.

Accurately mapping out the field boundary can be challenging or cumbersome using conventional techniques. For example, an operator may have to manually set the precise field boundary (e.g., down to a few inches) by manually driving the AOV along the outer edge of the field while recording location data of the AOV on a map, and maneuvering around areas or obstacles or regions that are not navigable by the AOV. As another example, a machine-learned model may have to be trained to identify a variety of specific non-navigable field characteristics the AOV may encounter while navigating along the outer edge of the field and learn to maneuver around. However, such a model trained on specific different non-navigable field characteristics may require a prohibitively large amount of training data and thereby incur significant computational expense and cost for the training. As used herein, a "non-navigable field characteristic" refers to any area, region, object, thing, obstacle, obstruction, or entity that may interfere with the ability of the AOV to navigate within the off-road environment or field or otherwise cause harm to the AOV, the non-navigable field characteristic, or another entity. Non-limiting examples of a non-navigable field characteristic the AOV may encounter while navigating include a dirt pile, a ditch, a wooded area, a telephone pole, an electric pole, a fence line, a road, a diesel tank, a well, a stream, a canal, or anything else that the AOV should maneuver around while autonomously navigating in the field to avoid damage to any equipment, property, or entity.

In order to overcome the above problems with conventional field boundary detection techniques, the present disclosure proposes a system and method for automatic field boundary generation that utilizes spectral image data. For example, in addition to visible spectrum image data (e.g., RGB image data, multi-band visible image data), the spectral image data may include non-visible spectrum image data such as shortwave infrared (SWIR) image data, longwave or thermal infrared (LWIR) image data, near-infrared (NIR) image data, ultraviolet (UV) image data, and the like. Techniques disclosed herein look to develop and utilize a machine-learned model(s) that can accept the spectral image data (e.g., multispectral image data, hyperspectral image data) as input, and perform one or more classification operations to classify portions of the field (e.g., portions near the edge or border of the field) as including crops and not including crops, and further classify portions of the field identified as not including crops as navigable or non-navigable. The system may then perform a transformation operation based on the classification data and further based on location data of the AOV corresponding to the classification data to map out or generate the field boundary that separates navigable from non-navigable regions of the field automatically and accurately. The additional information (e.g., signature data) that can be obtained from the non-visible spectrum image enables the system to more accurately classify regions such as "crop" from "non-crop", or more generally, "plant" from "non-plant", without having to train the model to specifically learn what entity or object the "non-crop" or "non-plant" portion is, thereby simplifying operation and minimizing the amount of training data required. The AOV can thus subsequently navigate the field in an autonomous operation mode based on the automatically generated and set field boundary.

FIG. 1 illustrates an autonomous off-road vehicle system environment, according to various embodiments. The environment 100 of FIG. 1 includes an off-road vehicle 110 ("AOV" or simply "vehicle" hereinafter), a central server 130, a client device 140, and a machine learning engine 150, each communicatively coupled via a network 160. It should be noted that in other embodiments, the environment 100 may include different, fewer, or additional components than those illustrated in FIG. 1. For instance, the machine learning engine 150 may be implemented within the central server 130 or may be included within the AOV 110. Likewise, the client device 140 and the central server 130 can be the same device.

The off-road vehicle 110 of FIG. 1 includes a navigation engine 112, external sensors 114, a machine-learned model 116, a computer vision engine 117, and a field boundary generator 118. In other embodiments, the AOV 110 includes fewer, different, or additional components than those illustrated in FIG. 1. For instance, some of the functionality of the AOV 110 (e.g., functionality provided by the machine-learned model 116, the computer vision engine 117, and/or by the field boundary generator 118) may be subsumed by one or more of the central server 130, and the client device 140. Other components, such as engines, drivetrains, communication components, structural components, and the like aren't illustrated for the purposes of simplicity.

The navigation engine 112 enables the AOV 110 to perform various navigation operations. For instance, the navigation engine 112 enables the AOV 110 to perform an autonomous navigation operation. As another example, the navigation engine 112 enables the AOV 110 to perform a path planning operation. The autonomous navigation operation may entail the AOV 110 autonomously navigating within the environment 100 from one location to another. For instance, the navigation engine 112 can, in response to identifying a task or function to be performed by the AOV 110, identify a location associated with the identified task or function, and can select a route from a current location of the AOV to the identified location, and autonomously navigate along the selected route in the environment 100. The path planning operation may entail determining and setting one or more path plans for the AOV 110 to cover a crop area within the environment 100 in an energy efficient manner. The crop area (e.g., where crops grow) may represent a navigable area of a field where crops and/or weeds grow. Some example crops include cotton, lettuce, soybeans, rice, carrots, tomatoes, corn, broccoli, cabbage, potatoes, wheat, or any other suitable commercial crop. The weeds may be grasses, broadleaf weeds, thistles, or any other suitable determinantal weed. Based on the set path plan, the AOV 110 may traverse the entire crop area or a portion thereof to perform various farming operations. The path plan may be executed by the AOV 110 by autonomously navigating over a plurality of linear rows, so as to cover the entire crop area while minimizing at least one of a total drive length, a total number of turns, a total drive time, and the like.

Before the navigation engine 112 can perform at least one of the autonomous navigation operation, and the path planning operation in a given field, it may be necessary to perform an automatic field boundary generation operation for the given field according to one or more embodiments. The automatic field boundary generation operation enables the AOV 110 to autonomously navigate in the field within the generated and set field boundary that is representative of a field area where the AOV 110 can navigate safely. To perform the automatic field boundary generation operation, the AOV 110 may utilize the external sensors 114, the machine-learned model 116, the computer vision engine 117, and the field boundary generator 118.

In some embodiments, an operator may manually operate the AOV 110 in the field while the external sensors 114 are operated to capture sensor data. For example, the automatic field boundary generation operation may be performed as a background process while the AOV 110 is being operated in a manual mode in the field to perform various farming operations (e.g., plant a crop (or precursor thereto), treat a crop (or precursor thereto), harvest a crop, or perform another task associated with the crop). As another example, the automatic field boundary generation operation may be performed as an initial step when the AOV 110 enters a new field by manually operating the AOV 110 to navigate along the outer edge or boundary of the field (and along any internal edges corresponding to non-navigable areas or regions) while the external sensors 114 are operated to capture sensor data (e.g., GPS data, visible spectrum and non-visible spectrum image data). As yet another example, a user may input on a map information indicating the outer edge or boundary of the field (and any internal edges corresponding to the non-navigable areas; e.g., geolocation data), and the input information may be used to capture sensor data by the external sensors 114.

The sensor data captured by the external sensors 114 may include information representative of the surroundings the AOV 110, representative of a current geographic position (e.g., geolocation data) of the AOV, representative of objects, vehicles, or obstructions within a threshold proximity of the AOV, and the like. For example, the sensors 114 can include cameras (e.g., spectral camera, multispectral camera, hyperspectral camera, short wave infrared camera, a 3D camera, camera array, and the like) that capture spectral image data (e.g., image data in the non-visible spectrum (e.g., NIR image data, SWIR image data, thermal image data, LWIR image data, UV image data, and the like), image data in the visible spectrum (e.g., RGB image data)), a location sensor (e.g., GPS receiver, Bluetooth sensor), a LIDAR system, a RADAR system, depth sensors, proximity detectors, or any other component.

The sensors 114 may thus be configured to detect one or more of the visible spectrum image data, the non-visible spectrum image data, location data (e.g., geolocation data) indicating a location of the AOV 110 on a map corresponding to the field, a presence of objects or things within a proximity of the AOV 110, dimensions of any detected objects or things, and the like. The external sensors 114 can be mounted on an external surface or appendage of the AOV 110, can be located within the AOV, can be coupled to an object or surface external to the AOV, or can be mounted to a different vehicle.

The machine-learned model 116 may be configured to perform a plurality of classification (e.g., identification) operations. Alternately, or in addition, the plurality of classification operations may be performed by the computer vision engine 117. For instance, the AOV 110 can capture spectral images (e.g., images having one or more bands in the visible spectrum, images having one or more bands in the non-visible spectrum, multispectral images, hyperspectral images) of a region along the (outer and, optionally, any inner) edge of the field, and input the spectral image data to the machine-learned model 116 to perform classification operations. The classification operations may include a first classification operation to identify portions of the field as including crops and portions of the field as not including crops (e.g., identify at or near the field boundary, an edge between the region including crops and the region not including crops). The classification operations may further include a second classification operation to identify, for portions of the field identified as not including crops, portions that are navigable and portions that are non-navigable (e.g., identify at the field boundary and in the region not including crops (e.g., headland region), an edge (field boundary) between a region that is navigable by the AOV 110 (e.g., region including weeds, other non-crop plant-life, a dirt road, and the like), and a region that is not navigable by the AOV 110 (e.g., a region that includes a non-navigable field characteristic like a tree, a wooded area, an electric pole, a paved road, a public road, a region outside the cadastral boundary of the field, and the like)). A result of the first and second classification operations may be output as classification data from the machine-learned model 116 (and/or from the computer vision engine 117).

In some embodiments, the machine-learned model 116 is trained on a training corpus of tagged images and is configured to perform one or more computer vision classification operations based on the training to generate the classification data. In some embodiments, the machine-learned model 116 is trained based on a training set of data that includes historical images and corresponding classifications (e.g., crop region, non-crop region, plant region, non-plant region, a region including or surrounding a non-navigable field characteristic, and the like) based on an identity of objects, things, regions, or entities present within the images. In some embodiments, the computer vision engine 117 includes an algorithm (such as a computer vision algorithm) that is configured to perform the classification operations using one or more of the sensors 114 of the AOV 110 (e.g., spectral cameras, GPS sensors, depth sensors, and the like).

In some embodiments, the external sensors 114 of the AOV 110 may capture spectral image data including image data in the visible spectrum (e.g., RGB image data corresponding to wavelengths from about 380 to about 750 nanometers), and image data in the non-visible spectrum (e.g., image data corresponding to wavelengths less than about 380 nanometers (e.g., UV image data) or greater than about 750 nanometers (e.g., NIR image data, SWIR image data, LWIR image data, thermal image data, and the like)). The external sensors 114 may also capture location information (e.g., geolocation data, GPS data) corresponding to the spectral image data. The AOV 110 may then use the machine-learned model 116 (and/or the computer vision engine 117) to identify a portion (e.g., section, region, area) of an image (e.g., an image in the visible spectrum) that includes crops (e.g., a crop type associated with the field), and a portion of the image that does not include crops. As another example, the AOV 110 may use the machine-learned model 116 (and/or the computer vision engine 117) to identify a portion (e.g., section, region, area) of an image (e.g., an image in the visible spectrum) that includes one or more types of plants, and a portion of the image that does not include any plants. The AOV 110 may further use the machine-learned model 116 (and/or the computer vision engine 117) to classify the section of the image that is determined to not include crops into a subsection that is determined to be navigable by the AOV 110 (e.g., a region that includes plant-life (e.g., weeds) and not crop-life) and a subsection that is determined to be non-navigable by the AOV 110 (e.g., a region that includes an obstacle, a region that includes a non-navigable field characteristic, a region that does not include plant-life or crop-life). The application and training of the machine-learned model 116 is described below in greater detail in connection with FIG. 2. The machine-learned model 116 can be received from the machine learning engine 150, for instance periodically, in advance of the operation of the AOV 110, or in response to a request from the AOV.

The field boundary generator 118 may be configured to automatically generate and set the field boundary based on the classification data output from the machine-learned model 116 (and/or from the computer vision engine 117). For instance, the field boundary generator 118 may utilize the geolocation data from the external sensors 114, and the classification data corresponding to the spectral image data from the machine-learned model 116 (and/or the computer vision engine 117), and perform a transformation operation to accurately draw on a map the field boundary that defines the field area that is navigable by the AOV 110 and an area outside the field boundary that is non-navigable. The transformation operation may also provide information regarding a crop area within the field boundary and a non-crop area that is also within the field boundary and is navigable.

For example, the field area defined by the field boundary may include the crop area (e.g., where crops grow) of the field, and a navigable headland area of the field, and exclude non-navigable areas. Further, the field boundary may also include an internal boundary surrounding a non-navigable area that may be inside the area defined by the outer edge of the field. For instance, the field boundary generator 118 may perform the transformation operation based on the received location data and the classification data to generate a first (internal) boundary surrounding the internal non-navigable field characteristic, and a second (external) boundary that may fully enclose the first boundary and correspond to the peripheral or outer boundary of the field. In some embodiments, the field boundary generator 118 may generate and set the field boundary such that the field area defined by the field boundary includes within its dimensions at least all portions (e.g., regions) of the field classified as including crops and exclude all portions (e.g., regions) of the field classified as non-navigable.

Once the field boundary generator 118 has automatically generated and set the field boundary, the navigation engine 112 can be controlled to perform the path planning operation and/or the navigation operation autonomously. For example, an operator can control to modify an operating mode of the AOV 110 from manual operation to automated operation, and in the automated operation mode, the navigation engine 112 may generate a navigation path through the field within the generated field boundary to execute a path plan related to a farming activity.

The central server 130 is a computing system located remotely from the AOV 110. In some embodiments, the central server is a web server or other computer configured to receive data from and/or send data to one or more autonomous vehicles within the environment 100. In some embodiments, the central server 130 receives information from the AOV 110 and other vehicles indicating a location of the vehicles, the field boundary generated and set for the vehicle, a function or operation being performed by the vehicles, a state of the one or more vehicles, and the like. In some embodiments, the central server 130 receives information describing the surroundings of the AOV 110 (e.g., the spectral image data), and corresponding location information. In some embodiments, the central server 130 receives a real-time feed of data from the AOV 110, such as a real-time video feed (e.g., multispectral video feed, hyperspectral video feed) of the environment surrounding the AOV. In some embodiments, the central server 130 can provide information to the AOV 110, such as an instruction to perform an operation or function, a navigation instruction (such as a route), and the like. In some embodiments, the central server 130 can enable a remote operator to assume manual control of the AOV 110, and provide manual navigation or operation instructions to the AOV. In some embodiments, some of the functionality of the AOV 110 may be subsumed by the central server 130. For example, the sensor data (e.g., spectral image data, geolocation data) from the external sensors 114 may be transmitted by the AOV 110 to the central server 130, and the central server 130 may subsume functionality corresponding to the machine-learned model 116, the computer vision engine 117, and the field boundary generator 118 to generate and set the field boundary for the AOV 110 based on the received sensor data.

The central server 130 includes an interface engine 135 configured to generate one or more interfaces for viewing by a user (such as a user of the central server 130 or a user of the client device 140). The user can be a remote operator of the AOV 110, can be an individual associated with the environment 100 (such as a site foreman or a landowner), can be an individual associated with the AOV 110 (such as a repairman, an on-site coordinator, or the like), or can be any other suitable individual. The interface engine 135 can be used by a user to provide one or more instructions to an AOV 110, such as navigation instructions, path planning instructions, field boundary detection and setting instructions, operation or function instructions, remote piloting instructions, and the like.

The interface engine 135 can generate a user interface displaying information associated with the AOV 110, other vehicles, or the environment 100. For instance, the user interface can include a map illustrating a location and/or movement of each AOV 110 within a field, a field boundary that is automatically generated by the AOV 110 (or by the central server 130) and that is overlaid on the map (see FIG. 3), a path plan generated for the AOV 110 (see FIG. 3), and the like. The user interface can display notifications generated by and/or received from the AOV 110, for instance within a notification feed, as pop-up windows, using icons within the map interface, and the like. By communicatively coupling to multiple AOVs 110, the central server 130 beneficially enables one user to track, monitor, and/or control multiple AOVs simultaneously.

The client device 140 is a computing device, such as a computer, a laptop, a mobile phone, a tablet computer, or any other suitable device configured to receive information from or provide information to the central server 130. The client device 140 includes a display configured to receive information from the interface engine 135, that may include information representative of one or more AOVs 110 or the environment 100. The client device 140 can also generate notifications (such as notifications generated by an AOV 110) for display to a user, such as a text message or operating system notifications. The client device 140 can include input mechanisms (such as a keypad, a touch-screen monitor, and the like), enabling a user of the client device to provide instructions to an AOV 110 (via the central server 130). It should be noted that although the client device 140 is described herein as coupled to an AOV 110 via the central server 130, in practice, the client device 140 may communicatively couple directly to the AOV (enabling a user to receive information from or provide instructions to the AOV without going through the central server 130).

The machine learning engine 150 is configured to access or generate one or more sets of training data, and to train one or more machine-learned models based on the training data. In some embodiments, the machine learning engine 150 may train at least a first machine-learned model to perform the first classification operation, and a second machine-learned model to perform the second classification operation. The machine learning engine 150 can access the training data from one or more AOVs 110, the central server 130, the client device 140, or any other suitable data source. For instance, the training data may include image data (e.g., visible spectrum image data, non-visible spectrum image data) of historical fields and labeled as including crops or not including crops (or as including types of plants or not including any type of plant), and image data (e.g., visible spectrum image data, non-visible spectrum image data) of historical fields and labeled as not including crops and further labeled as navigable or non-navigable.

Upon training the machine-learned models, the machine learning engine 150 can provide the machine-learned models to the central server 130 for storage and/or distribution to one or more AOVs 110 of the environment 100, or for generation of the field boundary corresponding to the environment 100 using the trained machine-learned models, based on the sensor data received from the AOV 110. As another example, the machine learning engine 150 can provide the trained machine-learned models directly to the AOV 110 for generation of the field boundary by the field boundary generator 118. Although illustrated as a standalone component in FIG. 1, the machine learning engine 150 can be implemented within a computing system, such as a server or a personal computer, or (as described above) can be implemented within the central server 130, the client device 140, or the AOV 110. Functionality of the machine learning engine 150 is described in greater detail below in connection with FIG. 2.

As noted above, the systems of FIG. 1 are configured to communicate via a network 160, which may include any combination of local area and/or wide area networks, using both wired and/or wireless communication systems. In one embodiment, the network 160 uses standard communications technologies and/or protocols. For example, the network 160 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 160 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 160 may be represented using any suitable format, such as hypertext markup language (HTML) or extensible markup language (XML). In some embodiments, all or some of the communication links of the network 160 may be encrypted using any suitable technique or techniques.

Training and Application of the Machine-Learned Models

Figure 2:
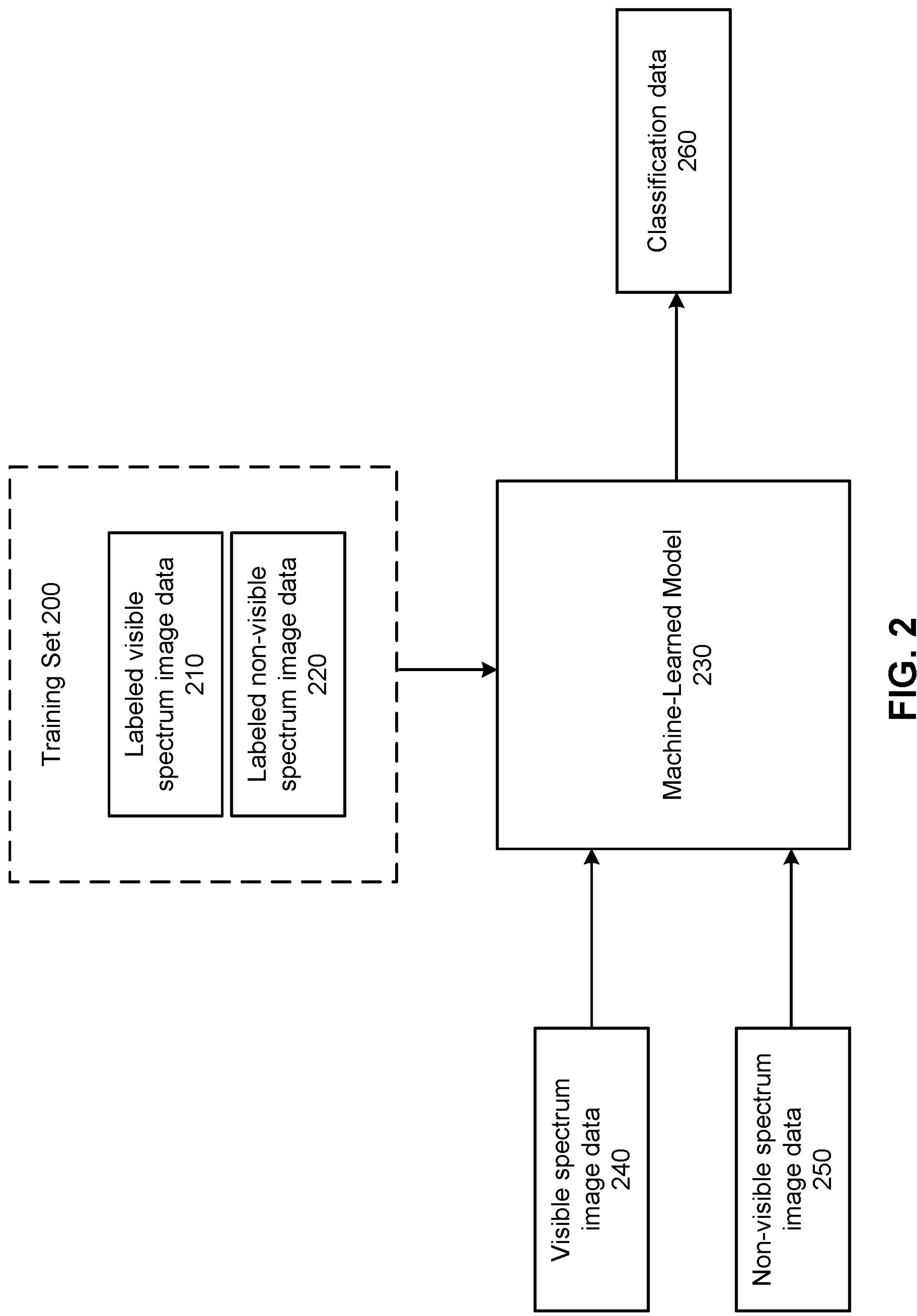
FIG. 2 illustrates the training and application of a machine-learned crop classification model for automatically generating a field boundary, according to various embodiments.

FIG. 2 illustrates the training and application of a machine-learned crop classification model, according to various embodiments. In the embodiment of FIG. 2, the machine learning engine 150 generates or accesses a training set of data 200 ("training set 200"), which may include labeled visible spectrum image data 210 and labeled non-visible spectrum image data 220. For example, the training set 200 may include labeled visible spectrum image data 210 of historical fields that is labeled as including crops, corresponding labeled non-visible spectrum image data 220 of historical fields that is labeled as including crops, labeled visible spectrum image data 210 of historical fields that is labeled as not including crops, and corresponding labeled non-visible spectrum image data 220 of historical fields that is labeled as not including crops. As another example, the training set 200 may include labeled visible spectrum image data 210 of historical fields that is labeled as not including crops and further labeled as navigable, corresponding labeled non-visible spectrum image data 220 of historical fields that is labeled as not including crops and further labeled as navigable, labeled visible spectrum image data 210 of historical fields that is labeled as not including crops and further labeled as non-navigable, and corresponding labeled non-visible spectrum image data 220 of historical fields that is labeled as not including crops and further labeled as non-navigable. As yet another example, the training set 200 may also include labeled visible and/or non-visible spectrum image data labeled as including different types of plants, or not including any type of plant.

Instead of training the machine-learned model to learn to detect specific crop types (e.g., cotton, lettuce, soybeans, rice, carrots, tomatoes, corn, broccoli, cabbage, potatoes, wheat, and the like), specific plant types (e.g., grasses, broadleaf weeds, thistles, and the like), and specific non-navigable field characteristics (e.g., a dirt pile, a ditch, a telephone pole, an electric pole, a fence line, a road, a well, a stream, a canal, a ditch, a tree, and the like) with corresponding respective labeled image data, the machine-learned model 230 may be trained using the training set 200 that trains the model to classify portions of the input image into general categories like "crop", "non-crop", "plant", "non-plant", "navigable", "non-navigable", and the like. That is, the training set 200 includes labeled visible and non-visible spectrum image data that can train the model to classify portions of an image into general categories like "crop", "non-crop", "plant", "non-plant", "navigable", "non-navigable", and the like. Alternately, or in addition, as explained above in connection with FIG. 1, the computer vision engine 117 (e.g., computer vision spectral data algorithm) may be configured to classify portions of the input image into general categories like "crop", "non-crop", "plant", "non-plant", "navigable", "non-navigable", and the like, using computer vision techniques and applied to the spectral image data.

In order to perform these general classifications, the present disclosure proposes the use of non-visible spectrum image data (corresponding to the visible spectrum image data) that can provide additional signature information (in addition to what is available from the corresponding visible spectrum image data), and using this extra signature information (in addition to signature information available from the visible spectrum image data) to accurately train a model (with a smaller training set of data) to easily be able to generally identify an area of an image (and corresponding region of a field) that is "yes" for "crop", and an area of an image (and corresponding region of a field) that is "no" for "crop". Further, the model may be trained to easily identify, for the area of an image (and corresponding region of a field) that is classified as being "no" for "crop", a subsection of the area (and corresponding subregion of the region of the field) that is a "yes" for "plant-life" (e.g., non-crop plant-life like weeds, glass, and the like), and a subsection of the area (and corresponding subregion of the region of the field) that is a "no" for "plant-life". In some embodiments, the model may identify the "yes plant" subregion as "navigable" by the AOV, and identify the "no plant" subregion as "non-navigable" by the AOV. Utilizing the training set 200 that includes the non-visible spectrum image data to train the model to classify portions of the input visible-spectrum image into general categories as described above reduces the amount of training data required, and as a result, reduces the amount of computational resources required, and reduces cost.

In some embodiments, although not shown in FIG. 2, the training set 200 may further include additional labeled data (e.g., visible spectrum image data, non-visible spectrum image data) that is labeled as including specific non-navigable field characteristics or obstacles, labeled as including specific types of plants, labeled as including specific types of crops, and the like. For example, the additional data (e.g., multispectral data) may include labeled data sets respectively labeled as including one or more of of a dirt pile, a ditch, a telephone pole, an electric pole, wooded area, a fence line, a road, a well, a stream, a canal, a tree, or another non-navigable field characteristic or obstacle or object or region that the machine-learned model is specifically trained to detect. In some embodiments, the machine-learned model 230 may include a supplemental model to supplement the above-described general classification of the field (e.g., into "crop" region, "non-crop" region, "plant" region, "non-plant" region, "navigable" region, "non-navigable" region, and the like) with predictions based on the additional labeled data to specifically identify, e.g., any non-navigable field characteristic (and corresponding region) present in the image, and update the classification of the field accordingly. For example, a given "navigable" region may be reclassified as being "non-navigable" based on the detection of, e.g., "a tree" by the supplemental model in the given region. As another example, a given "non-navigable" region may be reclassified as being "navigable" based on the detection of, e.g., "a dirt road" by the supplemental model in the given region. Utilizing the supplemental model(s) to update the classification data may improve accuracy of the subsequent automatically generated field boundary. The machine learning engine 150 can access the training set 200 in advance of training the machine-learned models, in response to a request for a machine-learned model, and the like.

The machine learning engine 150 trains one or more machine-learned models, such as a model configured to perform the first classification operation, a model to perform the second classification operation, the supplemental model, and the like, using the training set 200. It should be noted that the machine learning engine 150 can use any of a number of machine learning operations to train the machine-learned model 230. For example, the machine-learned model includes one or more of: a linear support vector machine (linear SVM), boosting for other algorithms (e.g., AdaBoost), a neural network, a logistic regression, a naïve Bayes classifier, a memory based learning, a random forest, a bagged tree, a decision tree, a boosted tree, or a boosted stump.

The machine-learned model 230 is applied to visible spectrum image data 240 and corresponding non-visible spectrum image data 250 to perform the first and second classification operations. The visible spectrum image data 240 may be, e.g., RGB image data corresponding to wavelengths from about 380 to about 750 nanometers. The non-visible spectrum image data 250 may correspond to the visible spectrum image data 240 (i.e., capture the same image frame) and may be image data in the non-visible spectrum (e.g., image data corresponding to wavelengths less than about 380 nanometers (e.g., UV image data) or greater than about 750 nanometers (e.g., NIR image data, SWIR image data, LWIR image data, thermal image data, and the like)). Together, the visible spectrum image data 240 and the corresponding non-visible spectrum image data 250 may be multispectral image data, hyperspectral image data, and the like.

The machine-learned model 230 may be configured such that the additional signature information extracted from the non-visible spectrum image data 250 is used (optionally, along with signature information extracted from the corresponding visible spectrum image data 240) to perform the first and second classification operations for the visible spectrum image data 240. That is, the machine-learned model 230 may classify portions of the visible spectrum image data as including crops or not including crops based at least in part on the (signature information obtained from the) non-visible spectrum image data. Further, the machine-learned model 230 may further classify portions of the visible spectrum image data classified as not including crops as navigable (e.g., including plants) or non-navigable (e.g., not including plants) based at least in part on the (additional signature information obtained from the) non-visible spectrum image data. Still further, the machine-learned model 230 may be configured to classify or identify (e.g., using the supplemental model described above) a type of plant life in the visible spectrum image data based on the non-visible spectrum image data, and based on the identified type of plant life in the visible spectrum image data, the machine-learned model 230 may classify the portions of the visible spectrum image data as including crops or not including crops.

A result of the classification or identification operations performed by the machine-learned model 230 may be output at the classification data 260. The field boundary generator 118 may perform the transformation operation based on the classification data 260, and corresponding location and/or other sensor data (e.g., GPS data from the external sensors

114, LIDAR data, depth sensor data, proximity detector data), to automatically identify the field area including the crop area, and the navigable non-crop area, thereby generating the field boundary of the field.

Example User Interface

Figure 3:
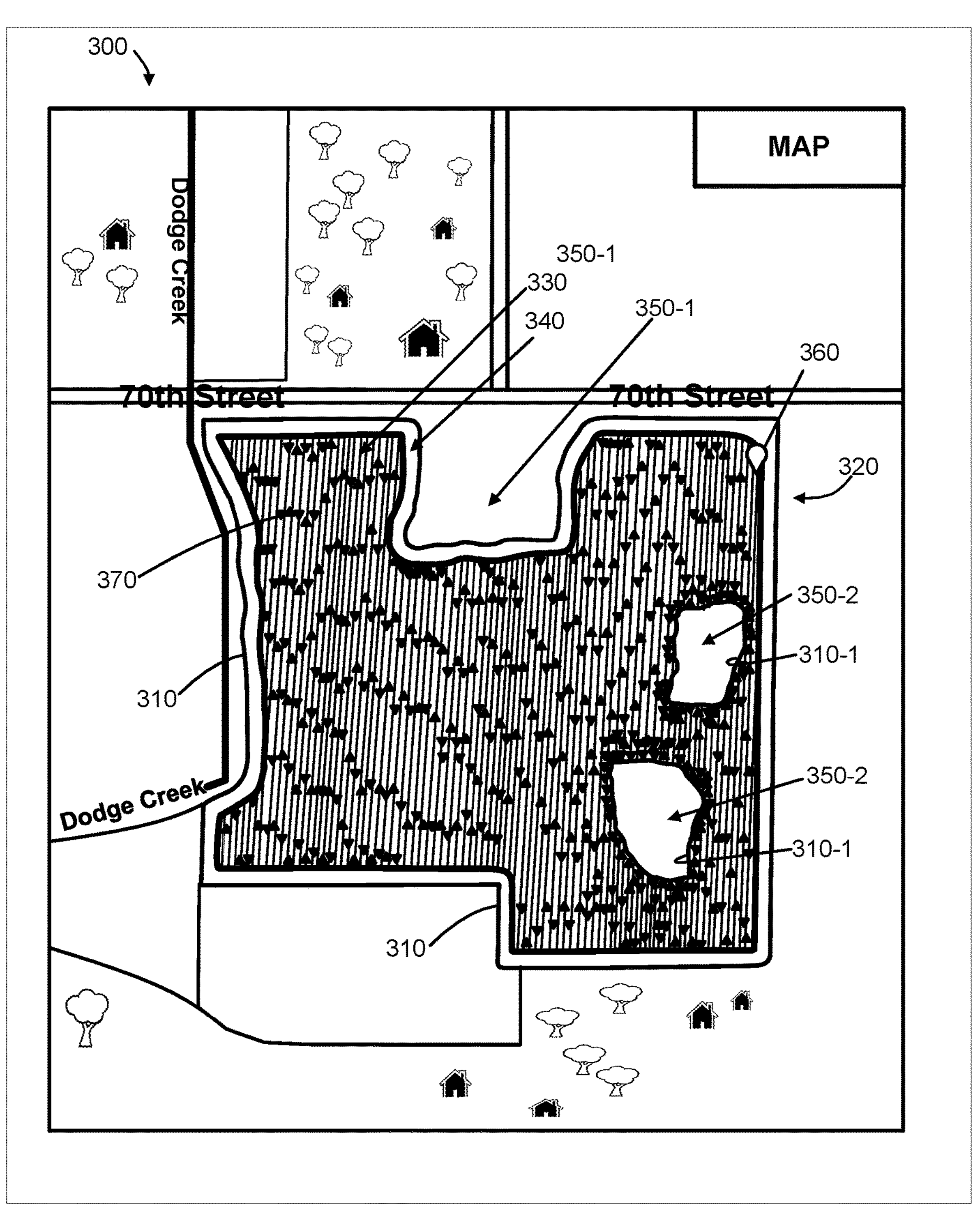
FIG. 3 depicts an exemplary user interface showing an automatically generated field boundary and a path plan for autonomous navigation within the field boundary of the field.

FIG. 3 depicts a user interface 300 illustrating a path plan determined through a field based on an automatically set field boundary. For example, the user interface 300 may be presented to the user of the AOV 110 on a display of the AOV 110 after completion of the automatic field boundary generation operation and the path planning operation. As another example, the interface engine 135 of the central server 130 can generate the user interface 300 to display information associated with the AOV 110 to a user of the central server 130 or the client device 140.

The exemplary user interface 300 shown in FIG. 3 depicts a field boundary 310 generated automatically by performing the automatic field boundary detection operation as described above in connection with FIGS. 1 and 2. As shown in FIG. 3, the field boundary 310 defines a field area 320 within the boundary that corresponds to an area that is navigable by the AOV 110. The field area 320 includes a crop area 330 of the field, and a navigable non-crop area 340 (e.g., headland area), and excludes a non-navigable non-crop area 350 (e.g., 350-1, 350-2). The non-navigable non-crop area 350 may be external to the field (e.g., 350-1), or may be internal (e.g., 350-2). As shown in the exemplary user interface 300 of FIG. 3, the field boundary 310 may include a first (internal) boundary (or boundaries) (e.g., 310-1) that surrounds a non-navigable non-crop area(s), and a second (external) boundary surrounding the first boundary.

Upon completion of the automatic field boundary detection and setting operation, a user may perform the above-described path planning operation to automatically determine and set a path plan 360 for the AOV 110 to cover the crop area 330 within the field in an energy efficient manner. Based on the set path plan 360, the AOV 110 may traverse the entire crop area 330 to perform a farming operation (e.g., tilling, planting, treating, harvesting) by autonomously navigating over a plurality of linear rows 370 so as to cover the entire crop area 330 while minimizing at least one of a total drive length, a total number of turns, a total drive time, and the like. As shown in the exemplary user interface 300, the path plan 360 causes the AOV 110 to autonomously navigate over the crop area 330 of the field, and the navigable non-crop area 340 (e.g., headland area), but not navigate over the non-navigable non-crop areas 350 of the field.

Example Autonomous Off-Road Vehicle Embodiments

Figure 4:
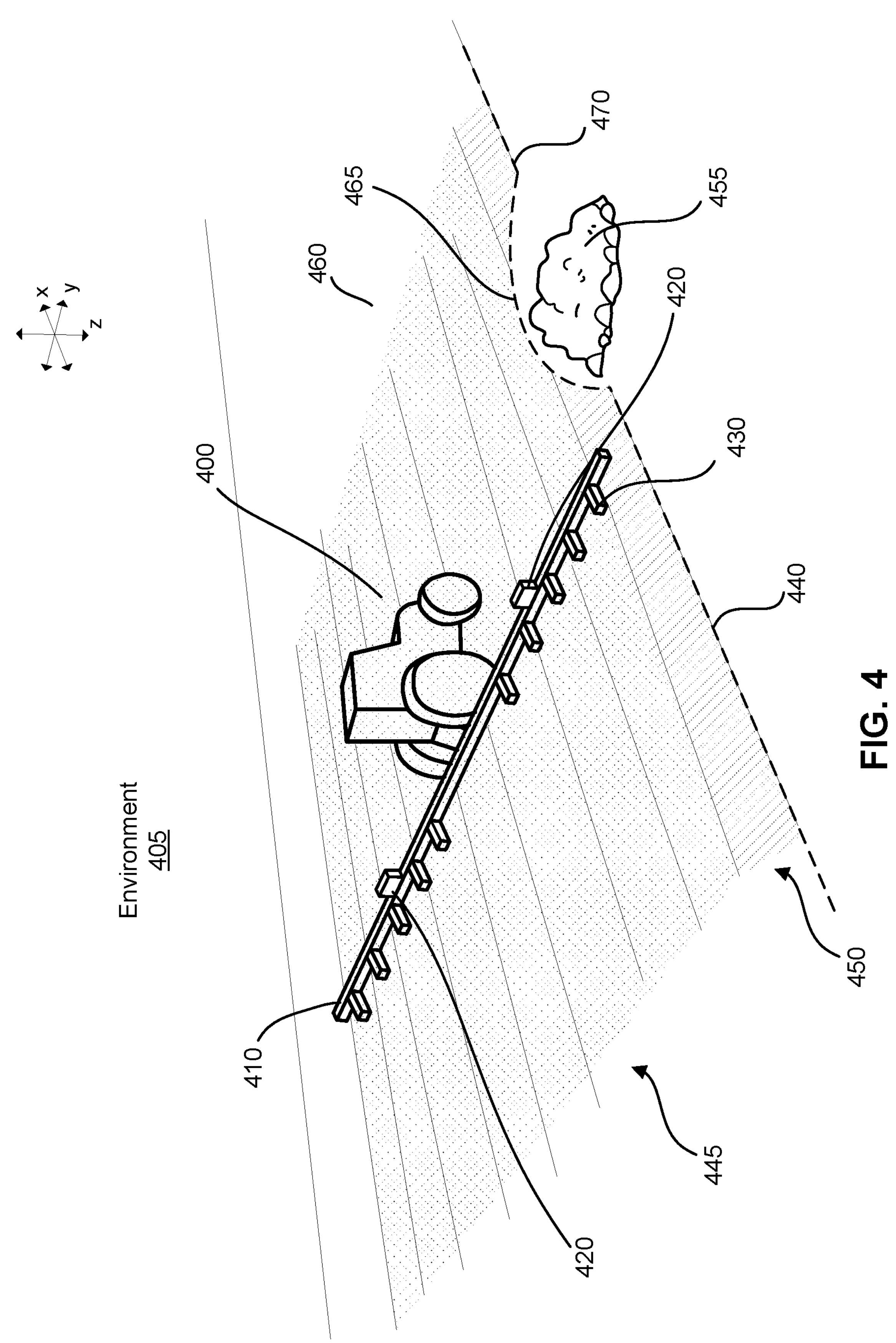
FIG. 4 illustrates an example autonomous off-road vehicle that performs actions within the automatically generated and set field boundary, according to various embodiments.

FIG. 4 illustrates an example autonomous off-road vehicle that performs actions within an automatically set field boundary, according to various embodiments. In the example of FIG. 4, the AOV is a farming machine 400 that performs different farming actions in a field 460. For example, a farming action may be to regulate plant growth by applying fertilizer to the plants in the field 460. The farming machine 400 may include a mounting mechanism 410, sensors 420, and a treatment mechanism 430. The described components and functions of the farming machine 400 are just examples, and the farming machine 400 can have different or additional components and functions other than those described in FIG. 4.

The mounting mechanism 410 provides a mounting point for the components of the farming machine 400. That is, the mounting mechanism 410 may be a chassis or frame to which components of the farming machine 400 may be attached. In the example shown in FIG. 4, the mounting mechanism 410 statically retains and mechanically supports the positions of the sensors 420 and the treatment mechanism 430. In the example configuration shown in FIG. 4, the mounting mechanism 410 extends outward from a body of the farming machine 400 such that the mounting mechanism 410 is approximately perpendicular to a longitudinal direction of the farming machine 400.

The mounting mechanism 410 may mount a plurality of the sensors 420. Sensors 420 may be the same as the external sensors 114 of the AOV 110 of FIG. 1, and detailed description of the sensors 420 is omitted here. For example, the sensors 420 may include one or more multispectral or hyperspectral cameras, a GPS receiver, a LIDAR system, and a depth sensor. In other embodiments, the farming machine 400 can include different, fewer, or additional external sensors, oriented or arranged on the AOV in different positions than illustrated in FIG. 4. For example, the sensors 420 may include an array of sensors (e.g., an array of cameras) configured to capture information about an environment 405 surrounding the farming machine 400. That is, the sensors 420 may include an array of cameras configured to capture an array of pictures (e.g., the visible spectrum image data, the non-visible spectrum image data) representing the environment 405 surrounding the farming machine 400.

The treatment mechanism 430 may include an array of treatment mechanisms positioned laterally along the mounting mechanism 410. The treatment mechanism 430 may implement farming actions in the operating environment 405 of the farming machine 400. For instance, the treatment mechanism 430 may apply a treatment to any portion of the operating environment 405 (e.g., soil, crop plant, non-crop plant, and the like). In some embodiments, the treatment mechanism 430 may include an array of spray nozzles to spray one or more of: an herbicide, a fungicide, insecticide, some other pesticide, or water.

FIG. 4 illustrates that the farming machine 400 is performing an autonomous farming action (as per a determined path plan) after the automatic field boundary generation operation and the path planning operation have been completed, and a field boundary 440 corresponding to a field 460 has been generated. For example, initially, a user may manually operate the farming machine 400 in a manual operation mode and drive the farming machine 400 along the edge of the field 460 while sensors 420 continuously capture the array of pictures in the visible spectrum and in the non-visible spectrum (e.g., multispectral image data), and further capture corresponding location information using, e.g., GPS sensors. This process may be continuously performed while the user in the manual operation mode drives the farming machine 400 along the edge (e.g., outer edge) of the whole field, including driving the farming machine 400 along a boundary of any internal non-navigable areas (e.g., 350-2 in FIG. 3). The image data thus captured along the entire outer edge and any internal non-navigable regions of the field may then be input to one or more machine-learned models. The models may perform the first classification operation to classify portions of the visible spectrum image into a portion that includes crops and a portion that does not include crops, based at least in part on the additional signature information available from the corresponding non-visible spectrum image. The one or more machine-learned models may also be utilized to further classify the portion of the visible spectrum image that does not include crops onto a subportion that is navigable and a subportion that is non-navigable based at least in part on the additional signature information available from the corresponding portion of the non-visible spectrum image. Based on the classification data and at least the corresponding geolocation data, the farming machine 400 (or a central server) may perform a transformation operation to generate the field boundary 440, and identify a region of the field 460 that includes crops (crop region 445), and a subregion of the non-crop region of the field that is navigable (navigable non-crop region 450; e.g., a region that is classified as including plant-life but not crops), and a subregion of the non-crop region of the field that is non-navigable (non-navigable non-crop region corresponding to dirt pile 455; e.g., a region that is classified as including no plants and no crops).

During the manual operation, when the operator encounters the dirt pile 455 along the outer edge of the field, the operator may maneuver the farming machine 400 to veer inward to avoid the dirt pile 455, while the sensors 420 capture the multispectral images of the dirt pile 455. Based on the captured multispectral images of the dirt pile 455, the machine-learned model classifies the dirt pile 455 as being a non-navigable field characteristic (e.g., classified as non-crop, and further classified as non-plant), even if the machine-learned model is not specifically trained to detect a "dirt pile". Based on the detection of the non-navigable field characteristic, the machine-learned model may classify the corresponding portion of the visible spectrum image as being non-navigable, and the transformation operation may cause the field boundary 440 to be adjusted to veer inward appropriately to avoid hitting the dirt pile 455 when driving in the autonomous mode, as shown in FIG. 4 at 465.

As a result of the automatic field boundary generation operation, the field 460 can be automatically and precisely classified into the crop region 445, the navigable non-crop region 450, and the non-navigable region (region on the side of the field boundary 440 that is opposite to the side of the navigable non-crop region 450 and that includes the dirt pile 455). As a result, during any subsequent autonomous operation of the farming machine 400 in the field 460, since the field boundary 440 has been automatically generated and set, the farming machine 400 can safely navigate within the environment 405 to perform various farming actions. Further, when navigating along the outer edge of the field 460 to perform any farming actions, since the field boundary is set so that the navigable non-crop region 450 is identified and included within the field boundary 440, the farming machine 400 is able to autonomously perform the farming action (e.g., spray pesticide) all the way to the outer edge of the crop region 445, and also able to autonomously maneuver to veer in to the field to avoid any obstacles (e.g., dirt pile 455) based on the automatically set field boundary and then veer back out (e.g., at 470), thereby minimizing an area of the crop region 445 where the farming action (e.g., spray pesticide) is not performed all the way to the outer edge of the crop region 445.

Process for Automatically Detecting and Setting a Field Boundary

FIG. 5 is a flow chart 500 illustrating a process for automatically detecting and setting a field boundary based on crop classification data, according to various embodiments. It should be noted that the process illustrated herein can include fewer, different, or additional steps in other embodiments.

Spectral image data (e.g., multispectral image data, hyperspectral image data) representative of contents of a field is accessed 510 via one or more sensors of a vehicle being manually operated in the field. The spectral image data includes visible spectrum image data and non-visible spectrum image data (e.g., SWIR image data). Portions of the field that include crops are identified 520 by applying a machine-learned model to the accessed spectral data. The model is configured to classify portions of the visible spectrum image data as including crops and not including crops based at least in part on the non-visible spectrum image data. A field boundary representative of areas where the vehicle can navigate is generated 530 based at least in part on the identified portions of the field that include crops. An operating mode of the vehicle is modified 540 from manual operation to automated operation. In the automated operation mode, the vehicle generates a navigation path through the field within the generated field boundary.

Additional Configuration Considerations

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like.

Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:

accessing, via one or more sensors of a vehicle being manually operated in a field, spectral image data representative of contents of the field, the spectral image data comprising visible spectrum image data and non-visible spectrum image data;

training a machine-learned model using a training set of non-visible spectrum image data, the training set including: (i) non-visible spectrum images of historical fields labeled as including crops, (ii) non-visible spectrum images of the historical fields labeled as not including crops and further labeled as navigable, and (iii) non-visible spectrum images of the historical fields labeled as not including crops and further labeled as non-navigable;

identifying, based on the accessed non-visible spectrum image data and by applying the machine-learned model to the spectral image data, (i) portions of the field that include crops, (ii) portions of the field that do not include crops but are navigable, and (iii) portions of the field that do not include crops and are non-navigable, wherein the machine-learned model is configured to classify portions of the visible spectrum image data as including crops and not including crops but navigable or non-navigable based at least in part on the non-visible spectrum image data; and generating a field boundary for the field representative of areas where the vehicle can navigate based at least in part on the identified portions of the field.

2. The method of claim 1, further comprising modifying an operating mode of the vehicle from manual operation to automated operation, wherein the vehicle, when operating in the automated operation mode, is configured to generate a navigation path through the field within the generated field boundary.

3. The method of claim 2, wherein generating the navigation path comprises generating a navigation path through the portions of the field classified as including crops and portions of the field classified as not including crops and navigable, and not through portions of the field classified as not including crops and non-navigable.

4. The method of claim 3, wherein the navigation path is generated to minimize navigation through portions of the field classified as not including crops and navigable.

5. The method of claim 3, wherein the navigation path is generated to minimize overall navigation time.

6. The method of claim 2, wherein generating the field boundary includes generating one or more boundaries that include all portions of the field classified as including crops and to exclude all portions of the field classified as non-navigable.

7. The method of claim 6, wherein at least a first boundary is fully enclosed by a second boundary, the first boundary surrounding an obstacle or a non-navigable field characteristic.

8. The method of claim 2, wherein the non-visible spectrum image data comprises one or more of: short wave infrared image data, thermal infrared image data, radar image data, and near-infrared image data.

9. The method of claim 2, wherein the machine-learned model is configured to identify a type of plant life based on the non-visible spectrum image data, and wherein classifying portions of the visible spectrum image data as including crops or not including crops is based on the identified type of plant life.

10. An autonomous off-road vehicle (AOV) comprising:

a spectral camera;

a hardware processor; and a non-transitory computer-readable storage medium storing executable instructions that, when executed by the hardware processor, cause the AOV to perform steps comprising:

capturing, via the spectral camera and while the AOV is being manually operated in a field, spectral image data representative of contents of the field, the spectral image data comprising visible spectrum image data and non-visible spectrum image data;

training a machine-learned model using a training set of non-visible spectrum image data, the training set including: (i) non-visible spectrum images of historical fields labeled as including crops, (ii) non-visible spectrum images of the historical fields labeled as not including crops and further labeled as navigable, and (iii) non-visible spectrum images of the historical fields labeled as not including crops and further labeled as non-navigable;

identifying, based on the captured non-visible spectrum image data and by applying the machine-learned model to the spectral image data, (i) portions of the field that include crops, (ii) portions of the field that do not include crops but are navigable, and (iii) portions of the field that do not include crops and are non-navigable, wherein the machine-learned model is configured to classify portions of the visible spectrum image data as including crops and not including crops but navigable or non-navigable based at least in part on the non-visible spectrum image data;

setting a field boundary for the field representative of areas where the AOV can navigate based at least in part on the identified portions of the field; and operating the AOV in an automated mode, wherein the AOV, when operating in the automated mode, is configured to generate a navigation path through the field within the field boundary.

11. The AOV of claim 10, wherein the executable instructions, when executed by the hardware processor, further cause the AOV to perform a step comprising capturing, via a location sensor mounted on the AOV, geolocation data corresponding to the spectral image data.

12. The AOV of claim 10, wherein the spectral camera includes one or more of a multispectral camera, a hyperspectral camera, a short wave infrared camera, and a thermal camera.

13. The AOV of claim 12, wherein the non-visible spectrum image data captured by the spectral camera includes at least one of: short wave infrared image data, thermal infrared image data, radar image data, and near-infrared image data.

14. A method for autonomously navigating an off-road vehicle (AOV) comprising:

capturing, via one or more sensors of an AOV being manually operated in a field, spectral image data representative of contents of the field, the spectral image data comprising visible spectrum image data and non-visible spectrum image data;

capturing, via a location sensor mounted on the AOV, geolocation data corresponding to the spectral image data;

transmitting the spectral image data and the corresponding geolocation data to a central server, the central server applying a machine-learned model to the spectral image data to identify, based on the captured non-visible spectrum image data, (i) portions of the field that include crops, (ii) portions of the field that do not include crops but are navigable, and (iii) portions of the field that do not include crops but are non-navigable, by classifying portions of the visible spectrum image data as including crops and not including crops but navigable or non-navigable based at least in part on the non-visible spectrum image data, wherein the machine-learned model is trained using a training set of non-visible spectrum image data, the training set including: (i) non-visible spectrum images of historical fields labeled as including crops, (ii) non-visible spectrum images of the historical fields labeled as not including crops and further labeled as navigable, and (iii) non-visible spectrum images of the historical fields labeled as not including crops and further labeled as non-navigable;

receiving, from the central server, a field boundary representative of areas where the AOV can navigate based at least in part on the identified portions of the field; and operating the AOV in an autonomous operation mode by generating a navigation path through the field within the generated field boundary.

15. The method of claim 14, wherein generating the navigation path comprises generating a navigation path through the portions of the field classified as including crops and portions of the field classified as not including crops and navigable, and not through portions of the field classified as not including crops and non-navigable.

16. The method of claim 15, wherein the navigation path is generated to minimize navigation through portions of the field classified as not including crops and navigable.

17. The method of claim 15, wherein the navigation path is generated to minimize overall navigation time.

* * * * *